(12) United States Patent
Cohen

(10) Patent No.: US 8,464,341 B2
(45) Date of Patent: Jun. 11, 2013

(54) DETECTING MACHINES COMPROMISED WITH MALWARE

(75) Inventor: Rami Cohen, Haifa (IL)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 12/177,355

(22) Filed: Jul. 22, 2008

(65) Prior Publication Data

US 2010/0024034 A1    Jan. 28, 2010

(51) Int. Cl.
*G06F 11/00* (2006.01)
(52) U.S. Cl.
USPC ............................... 726/22; 726/24; 713/200
(58) Field of Classification Search
USPC ........................................................... 726/22
See application file for complete search history.

(56) References Cited

U.S. PATENT DOCUMENTS

| | | | |
|---|---|---|---|
| 6,772,196 B1 * | 8/2004 | Kirsch et al. | 709/206 |
| 7,117,533 B1 * | 10/2006 | Libenzi | 726/24 |
| 7,237,008 B1 | 6/2007 | Tarbottom et al. | |
| 7,908,658 B1 * | 3/2011 | Oeij | 726/24 |
| 2002/0194490 A1 * | 12/2002 | Halperin et al. | 713/200 |
| 2003/0023875 A1 * | 1/2003 | Hursey et al. | 713/201 |
| 2004/0111632 A1 * | 6/2004 | Halperin | 713/200 |
| 2006/0143709 A1 * | 6/2006 | Brooks et al. | 726/23 |
| 2006/0174345 A1 | 8/2006 | Flanagan et al. | |
| 2007/0006028 A1 | 1/2007 | Desouza et al. | |
| 2007/0011741 A1 | 1/2007 | Robert et al. | |
| 2007/0016951 A1 | 1/2007 | Piccard et al. | |
| 2007/0101430 A1 * | 5/2007 | Raikar | 726/24 |
| 2007/0240217 A1 | 10/2007 | Tuvell et al. | |
| 2007/0271614 A1 * | 11/2007 | Capalik | 726/23 |
| 2007/0294396 A1 * | 12/2007 | Krzaczynski | 709/224 |
| 2008/0005782 A1 | 1/2008 | Aziz | |
| 2008/0080518 A1 | 4/2008 | Hoeflin et al. | |
| 2008/0155693 A1 * | 6/2008 | Mikan et al. | 726/23 |

FOREIGN PATENT DOCUMENTS

WO   WO 2007002002 A1 *  1/2007

OTHER PUBLICATIONS

"Canning more than SPAM with Bayesian Filtering," by Martin Overton, IBM Global Services, UK, Presented at the 2004 Virus Bulletin conference at the Fairmont Hote, Chicago, Illinois, Sep. 19-Oct. 1, 2004, 24 pgs. [online] [retrieved on May 1, 2008]. Retrieved from the Internet: http://momusing.com/papers/VB2004-Canning-more-tahn-SPAM-1.02.pdf.

(Continued)

*Primary Examiner* — Carl Colin
*Assistant Examiner* — S. Ali Zaidi
(74) *Attorney, Agent, or Firm* — Workman Nydegger

(57) ABSTRACT

A computer system can be configured to identify when it has been infected with or otherwise compromised by malware, such as viruses, worms, etc. In one implementation, a computer system receives and installs one or more decoy contacts in a contact store and further installs one or more malware reporting modules that effectively filter outgoing messages. For example, a malware reporting module can redirect messages with a decoy contact address to an alternate inbox associated with the decoy contact. The same malware reporting module, or another module in the system, can also generate one or more reports indicating the presence of malware, either due to detection of the decoy contact address, or due to identifying messages in the decoy contact inbox. The host computer system that sent the message to the decoy contact can then be flagged as infected with malware.

17 Claims, 3 Drawing Sheets

OTHER PUBLICATIONS

"HoneyIM: Fast Detection and Suppression of Instant Messaging Malware in Enterprise-like Networks," by Mengjun Xie, Zhenyu Wu, Haining Wang, The College of William and Mary, Date Unknown, 10 pgs. [online] [retrieved on May 1, 2008]. Retrieved from the Internet: http://www.cs.wm.edu/~hnw/paper/honeyim.pdf.

"Malware Protection: Planning the Right Technology Mix," by Paul Robichaux, 3Sharp LLC, Published Jan. 2007, 15 pgs. [online] [retrieved on May 1, 2008]. Retrieved from the Internet: http://download.microsoft.com/download/4/1/1/411c6fcc-d8a8-4b45-9e72-fadbe9160f38/Forefront_Server_Security_Defense_In_Depth.com.

"Network Monitoring Tool to Identify Malware Infected Computers," by NAVPREET SINGH, Computer Centre, Indian Institute of Technology, Kanpur, India; and Megha Jain, Payas Gupta and Shikha Bansal, Lnmiit, Jaipur, India, Date Unknown, 8 pgs. [online] [retrieved on May 1, 2008]. Retrieved from the Internet: http://www.security.iitk.ac.in/contents/repository/papers/auugpaper.pdf.

* cited by examiner

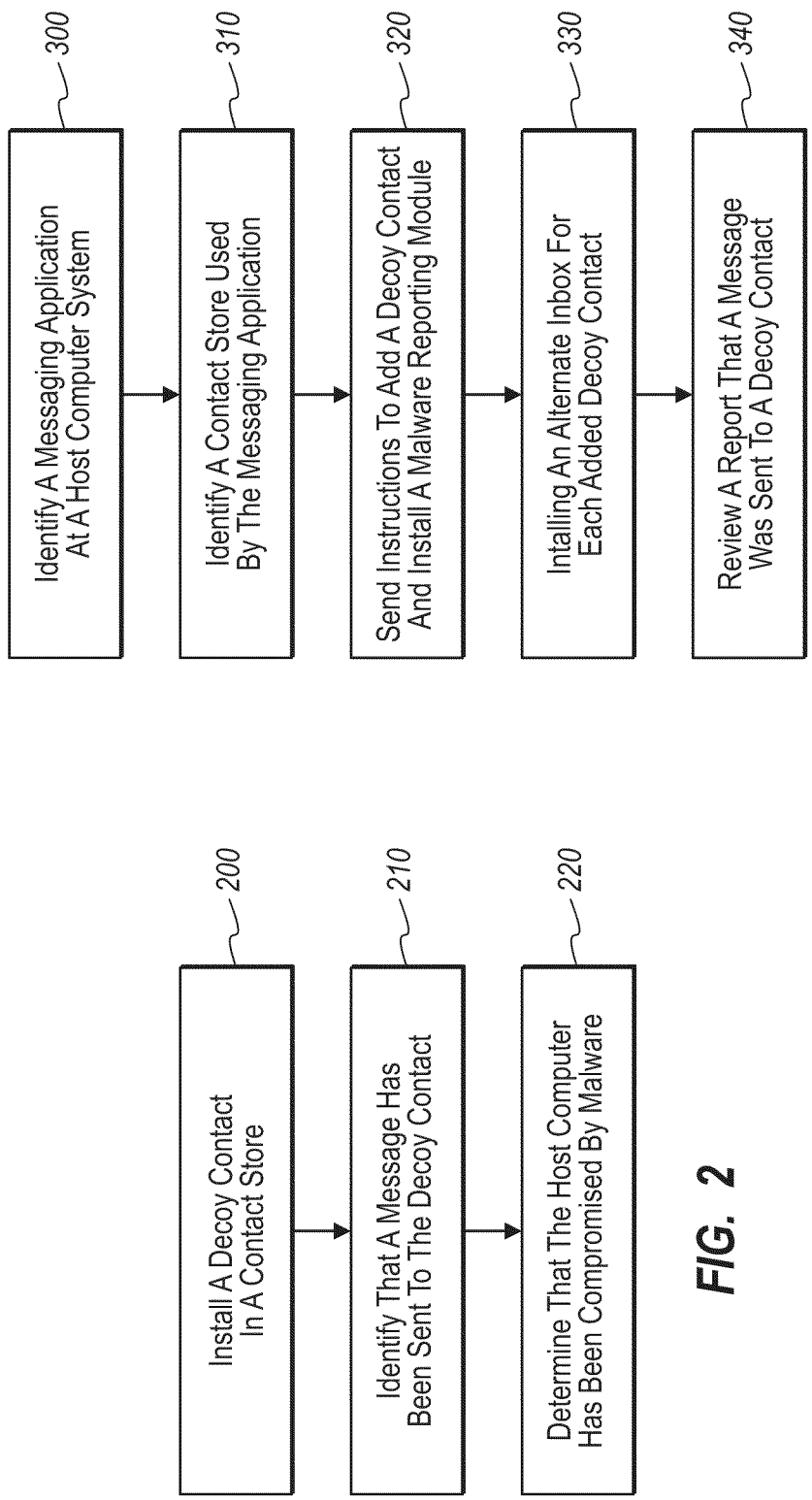

DETECTING MACHINES COMPROMISED WITH MALWARE

CROSS-REFERENCE TO RELATED APPLICATIONS

N/A

BACKGROUND

1. Background and Relevant Art

Users and organizations increasingly use electronic communication to transmit and receive information. One reason for this is that electronic communication tends to be faster, more efficient, and tends to provide better options than typically afforded through traditional postal mail and telephony. Conventional electronic communication mechanisms typically include electronic mail ("email"), instant messaging ("IM"), voice messaging ("VM"), text messaging, and the like.

One of the common advantages provided by most electronic communication mechanisms is the use of a contact list, or address book. For example, conventional email or IM software, and even some telephonic applications often provide for a contact list that allows a user to select a recipient by stored name, or some image/icon that is associated with an array of information for that user. The communication software will then identify the recipient's respective communication address depending on the type of desired communication, and initiate an appropriate communication channel with the chosen recipient(s). Such mechanisms can be used not only to initiate communications, but also to reply to communications from one or many different other users. In sum, electronic communication mechanisms provide a wide number of options and features for communicating with many different recipients easily, and virtually instantaneously.

Of course, it is well known that the ease afforded by conventional electronic communication mechanisms can also result in certain disadvantages not typically seen in traditional postal and telephonic communications. For example, "malware" is a constant and increasing problem that can lead to compromise of a user's confidential information and/or the user's computer performance. Conventional malware generally includes electronic files generally termed as "viruses," "worms," or the like, which a user inadvertently installs on a computer system. For example, the user may inadvertently obtain and install the file via an email from another trusted entity, viewing a particular internet page, or through a peer-to-peer communication mechanism, etc.

In many cases, the installed malware application then performs some malicious task, such as identifying confidential information (e.g., credit card information, government identifiers, etc.) on the host computer, and sending the confidential information to the malware provider. In some cases, the malware application may even be designed to cause other users that trust the infected user to release some confidential information. For example, the malware may send communication to other contacts in the infected user's contact list, which invites users at those computer systems to download and install the malware application (this process is usually called "propagation"). The downloaded malware may then obtain confidential information as before; or, if posing as a trusted entity, cause the recipient(s) to visit a website, and enter in some confidential information.

It is widely known that malware such as this can lead not only to the compromise of personal information, but also reduction of a host computer system's performance (if not outright destruction). Unfortunately, it is often difficult to detect that the malware has been installed—and/or is operating—on any given computer system. For example, although there are a number of security programs (e.g., computer anti-virus software) configured to detect and terminate malware, such security programs typically rely on various malware definitions.

The security programs will thus compare operations of an installed program with the installed malware definitions, flag a given program as malware, or flag a communication as containing malware. The security program may then either delete the program (or message), or provide the end-user with some response options. Of course, malicious entities are continually developing new types of malware that may work around the known malware definitions. Thus, conventional security programs are continually playing "catch-up," and it may be the case that certain new malware may cause a significant amount of damage before a user or system administrator ever detects the malware with updated malware definitions.

Accordingly, there are a number of difficulties that can be addressed with respect to identifying whether a computer system has been compromised with malware.

BRIEF SUMMARY

Implementations of the present invention overcome one or more problems in the art with systems, methods, and computer program products configured to identify when a computer system has been infected with or otherwise compromised by malware. In one implementation, for example, a computer system receives and installs one or more decoy contacts in a local contact list. Although the one or more decoy contacts can be hidden from the end-user, the decoy contact is configured so that malware will be unable to determine its legitimacy. One or more reporting modules can then automatically determine that the host computer system has been infected with malware upon any attempt to send a message to the decoy contact.

For example, one method in accordance with an implementation of the present invention of detecting the presence of malware can involve installing one or more decoy contacts in a contact store used by one or more messaging applications in a host computer system. The method can also involve identifying that one or more messages have been sent to any of the one or more decoy contacts from the host computer system. Furthermore, the method can involve determining that the host computer system has been compromised with one or more malware applications based at least in part on the message to the one or more decoy contacts.

In addition, another method in accordance with an implementation of the present invention of configuring a computer system to report the presence of a malware application can involve identifying one or more messaging applications used by a host computer system. The method can also involve identifying one or more contact stores that are used by the one or more messaging applications. In addition, the method can involve sending one or more messages to add one or more decoy contacts in any of the one or more contact stores.

The method can also involve receiving or sending messages to install one or more malware reporting modules configured at least in part to filter messages sent to the installed one or more decoy contacts. In addition, the method can involve installing one or more alternate inboxes configured to receive messages directed to the corresponding one or more installed decoy contacts. Furthermore, the more can involve reviewing one or more reports that indicate that a message has been sent to an installed decoy contact.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flowchart of a series of acts in a method in accordance with an implementation of the present invention for using a decoy contact to determine that a computer system has been infected with malware; and FIG. 3 illustrates a flowchart of a series of acts in a method in accordance with an implementation of the present invention for configuring a computer system to report the presence of malware based on one or more messages to a decoy contact.

DETAILED DESCRIPTION

Implementations of the present invention extend to systems, methods, and computer program products configured to identify when a computer system has been infected with or otherwise compromised by malware. In one implementation, for example, a computer system receives and installs one or more decoy contacts in a local contact list. Although the one or more decoy contacts can be hidden from the end-user, the decoy contact is configured so that malware will be unable to determine its legitimacy. One or more reporting modules can then automatically determine that the host computer system has been infected with malware upon any attempt to send a message to the decoy contact.

Accordingly, and as understood more fully herein, implementations of the present invention provide one or more methods that can be applied to multiple different messaging systems to detect the compromised hosts in their propagation stage. For example, at least one method is configured to rely on decoy (or "dummy") contact addresses that are located in the local and/or global contact list. The method can also involve use of contact addresses in the inbox and/or outbox (or sent items) of the given messaging system. In one implementation, the decoy contact address(es) can be made to be visible or invisible to the user, and can be generated manually (or automatically) on the host or in a remote machine. In addition, the list of one or more decoy contact addresses can be changed or refreshed with time by, for example, sending new one or more decoy messages from a decoy contact address to a particular user.

In either case, once a malware application attempts to propagate, such as by scanning the contact store or one of the messaging folders (e.g. inbox, outbox/sent items), the malware application will then send a message to the one or more installed decoy contacts/addresses. A messaging server or reporting module can then detect the malware message, such as by identifying the message in a decoy account that is associated to the decoy address. As understood more fully herein, the messaging server or module can then generate one or more alerts to indicate that the given host machine has been compromised.

Figure 1A:
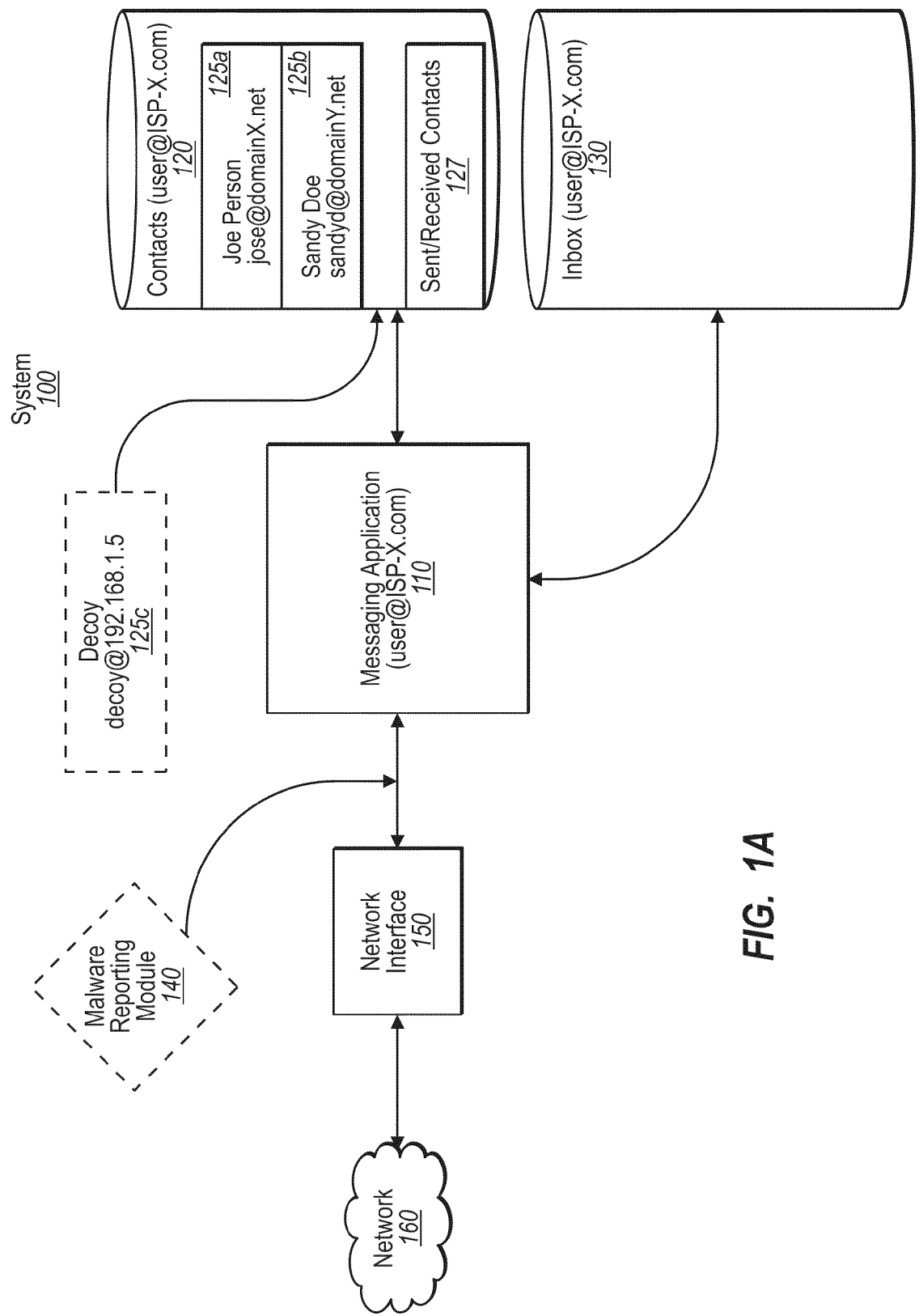
FIG. 1A illustrates an overview schematic diagram in accordance with an implementation of the present invention in which a reporting module and decoy contact are added to or installed on one or more computer systems.

Referring now to the Figures, FIG. 1A illustrates an overview schematic diagram of a computer system 100 in accordance with an implementation of the present invention that is configured for messaging. For example, FIG. 1A shows that computer system 100 comprises one or more messaging application programs 110 that send and receives messages over a network 160. In general, the illustrated messaging application 110 can comprise any sort of messaging/communication applications, including email, instant messaging, peer-to-peer applications, chat, or voice messaging programs that communicate information electronically to and from other entities (e.g., live or automated) over a network 160. Along these lines, FIG. 1A further shows that messaging application 110 can communicate messages over network 160 through one or more network interfaces 150.

In addition, FIG. 1A shows that messaging application 110 is in communication with at least one contact store 120 and at least one message inbox 130. One will appreciate that both contact store 120 and inbox 130 may or may not be uniquely configured for use solely by one messaging application 110. In one implementation, for example, one or both of contact store 120 and inbox 130 are used solely by messaging application 110, whereby additional messaging applications (not shown) in system 100 use still other contact stores (not shown) and inboxes (not shown). In addition, there may be cases in which the same contact store 120 and inbox 130 are used by multiple other different messaging applications 110. One will appreciate, therefore, that discussion herein with respect to messaging application 110, contact store 120, and inbox 130 are deemed applicable to one or more multiple uses of the same in system 100.

In addition, one will appreciate that system 100 itself need not comprise only a single computer system; and any one or more of the illustrated components 110, 120, 130, 150, etc. may thus be installed or otherwise reside on one or multiple different computer systems. For example, in one implementation, system 100 comprises a client computer system that includes messaging application 110 and network interface 150, but otherwise accesses contact store 120 and inbox 130 on another computer system (e.g., a messaging server) over network 160. In addition, messaging application 110, contact store 120, and inbox 130 can each reside primarily on a server computer system, which is accessed by a user through a separate client computer system that executes messaging application 110 from a remote location (i.e., over network 160).

In general, contact store 120 can comprise a plurality of different types of contacts, or contact addresses, each having different degrees of permanence. For example, FIG. 1A shows that contact store 120 can comprise a listing of relatively temporary contact addresses 127 in the form of addresses found in sent/received messages. In particular, system 100 may parse email or messaging addresses from sent and received messages, regardless of whether they are associated with one of the specifically stored contacts 125a and 125b, and store those parsed addresses for a limited period. For example, the sent/received contacts 127 can include a listing of all addresses found in messages in the user's (e.g., user@ISP-X.com) inbox 130 or outbox/sent items.

In addition, FIG. 1A shows that contact store 120 can comprise the more traditional, relatively permanent contacts 125, such as contacts 125a, and 125b, which the user of system 100 may have created and installed. FIG. 1A also shows, however, that system 100 has also received one or more requests to install or otherwise add one or more decoy contacts in the one or more contact stores 120. For example, an administrator of system 100 (e.g., a user of a personal computer, or a network administrator in an organization) initiates one or more installation instructions (or sends such instructions over a network) in order to install one or more decoy components (e.g., 125c). Accordingly, FIG. 1A shows that system 100 receives one or more decoy contacts (i.e., decoy contact 125c), and installs the one or more decoy contact in contact store 120 along with the already existing contacts 125a and 125b.

In general, there are a number of different ways that the one or more decoy contacts 125c can be presented and installed within system 100. In at least one implementation, for example, the installed one or more decoy contacts comprise a local network domain address (e.g., 192.168.1.5), such as the network address for the user's client system, or a local network address for the user's work email server. Of course, one will appreciate that the illustrated decoy contact address 125c may also or alternatively comprise a wide area network address, such as an internet domain-based messaging address. In other implementations, the decoy addresses themselves may even comprise an invalid network or domain address.

In addition, the one or more installed decoy contacts 125c can be hidden from the user. For example, although decoy contact 125c is installed along with contacts 125a and 125b, contact 125c can be designated (e.g., as a protected system file) so that it is never displayed through the user's messaging application 110 user interface, or through a file browser. One will appreciate that, however configured, hiding the decoy contact(s) 125c can ensure that the user does not remove the contact from contact store 120, or otherwise inadvertently send a message to contact 125c. One will appreciate that either situation could lead to either a false report of malware infection in the user's computer system, or otherwise lead to failure to identify propagating malware when it does exist in system 100.

In addition, the decoy contact 125c can be replaced on a periodic basis. For example, the administrator/user that initiated the installation of the one or more decoy contacts 125c at system 100 may periodically replace the prior decoy contacts 125c with one or more other decoy contacts with different messaging addresses (valid or otherwise). With respect to the listed address of FIG. 1A, for example, the administrator/user may replace decoy contact 125c (having an address of decoy@192.168.1.5) with a decoy contact 125c' (having an address of decoy2@192.168.1.5—not shown), etc.

Figure 1B:
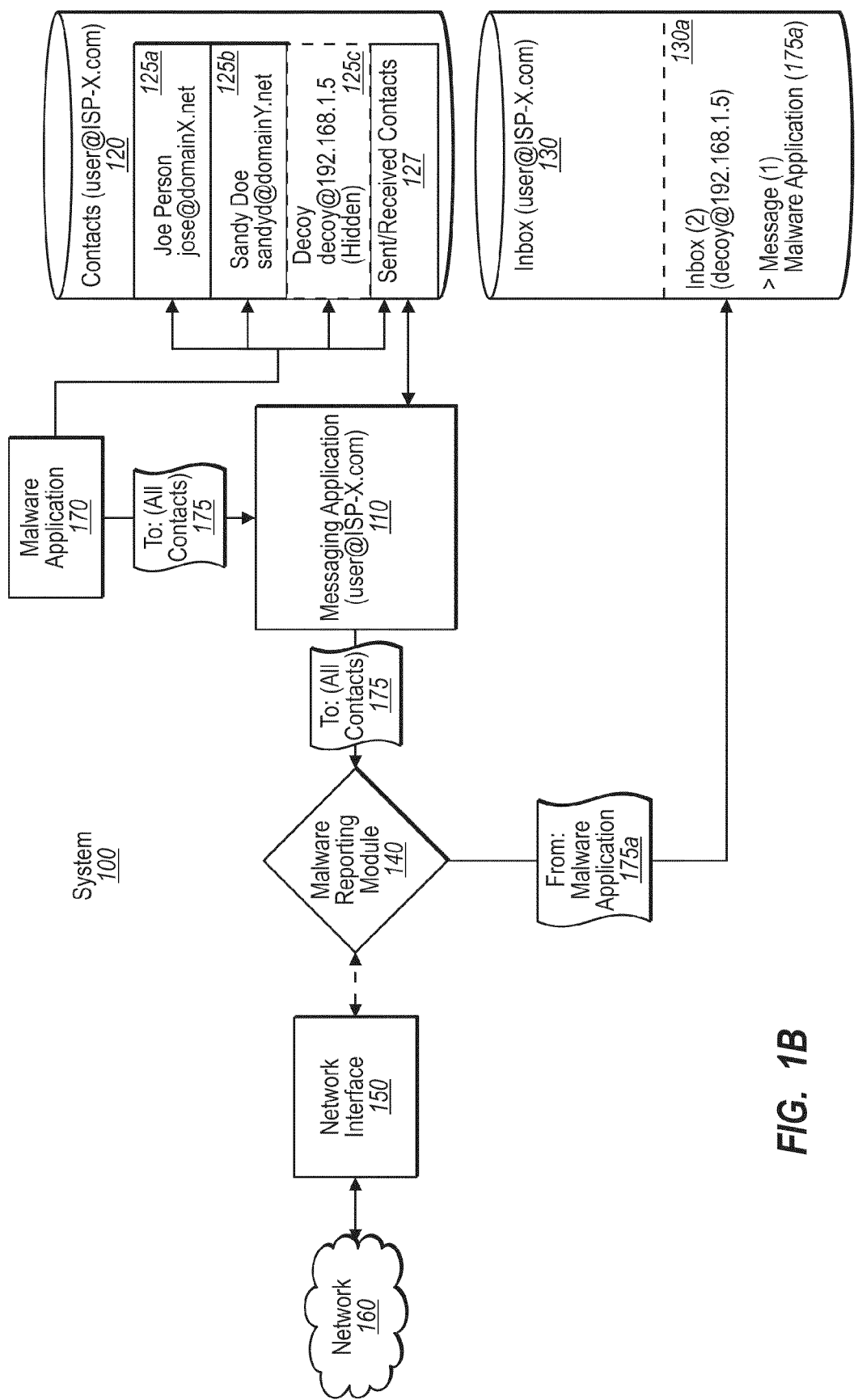
FIG. 1B illustrates the overview schematic diagram of FIG. 1A in which the one or more computer systems use the added reporting module and decoy contact to identify the presence of malware in the computer system.

One will appreciate that, with each decoy contact 125c, the administrator can also install a new inbox (e.g., 130a, FIG. 1B) corresponding to the installed decoy contact. For example, FIG. 1B illustrates an implementation in which the new inbox 130a comprises a storage partition of the user's traditional inbox 130 that is associated with the user's messaging application 110. Such an arrangement, however, is not required. In additional or alternative implementations, for example, the administrator creates the additional inbox 130a at a remote location that is separate from the location for inbox 130. Similarly, the administrator/user can install the alternate, new inbox corresponding to the decoy contact(s) 125c in another area of local storage.

FIGS. 1A and 1B also show that the administrator directs the installation of one or more malware reporting modules 150. For example, FIG. 1A shows malware reporting module 140 as it is being installed in system 100, while FIG. 1B illustrates malware reporting module 140 after it has been installed. In particular, FIG. 1B shows malware reporting module 140 in a position where it can intercept messages from malware application 170, i.e., between network interface 150 and messaging application 110. Of course, one will appreciate that such specific positioning is not required, and there may be other locations (e.g., after or in place of network interface 140) or arrangements that are equally suitable. For example, the administrator can install malware reporting module 140 so that it interfaces directly with the user's inbox (e.g., 130), such as in the case when the decoy contact address is a real/valid/legal address.

In either case, malware reporting module 140 comprises one or more sets of executable instructions configured to, when executed, identify an installed decoy contact address in an outgoing message for system 100. For example, FIG. 1B illustrates an example in which malware application 170 has been installed in system 100. As used herein, malware application 170 can comprise any form of potentially destructive or compromising software that sends messages to contacts 125, 127, such as in a manner that is unbeknownst or unintended by the user of system 100. In most cases, the user has only installed malware application 170 inadvertently, or unintentionally, such as by downloading the malware from a malicious website, or opening an executable received via one or more messaging applications 110. As previously discussed herein, such malware applications 170 can include, but are not limited to, viruses, worms, crawlers, spyware, adware, or the like.

FIG. 1B further shows that malware application 170 sends a request 170 through messaging application 110 to deliver a particular message to all of the contacts in contact store 120 (i.e., "propagation"). Notably, malware application 170 is sending message 175 to contacts it has identified, such as by scanning the contact store 120 directly, or otherwise scanning the contact store through message application 110. Whether or not malware application 170 specifically requests messaging application 110 to send message 175, however, is not required. For example, there may be instances in which malware application 170 may be configured to bypass messaging application 110 entirely, and send messages (e.g., 175) directly through network interface 150.

In either case, malware reporting module 140 is installed in all cases so that it intercepts any messages sent (or directed to be sent) by malware application 170. For example, FIG. 1B shows that malware reporting module 140 receives the one or more messages 175 sent, in this case, from malware application 170 via messaging application 110. FIG. 1B further shows that malware reporting module 140 identifies that at least one of the recipients in the one or more messages 175 are directed to a decoy contact 125c. Malware reporting module 140 can then take a number of different actions in response.

In one implementation (i.e., where module 140 interfaces between application 110 and interface 150), malware reporting module 140 automatically passes the message 175a containing the address for decoy contact 125c to the corresponding inbox 130a. Malware reporting module 140 (or another reporting module, not shown) can then periodically check the corresponding alternate inbox 130a and, upon identifying the presence of a message, perform a number of additional steps. In one implementation, for example, malware reporting module 140 scans message 175a (or sends message 175a to be scanned) to identify its origin, and eliminate the possibility that the user inadvertently selected decoy contact 125c as a recipient (whether or not the decoy address is a valid network/domain address). If determining that the scanned message is illegitimate (e.g., is from malware 170), malware reporting module 150 can then generate and send one or more reports that are identifiable by the administrator/user.

In additional or alternative implementations, malware reporting module 140 (or another module monitoring alternate inbox 130a) generates and sends a report to the administrator any time it detects decoy contact 125c in a message (whether or not the decoy address is a valid network/domain address). Furthermore, malware reporting module 150 can also alternatively be configured to stop communication of message 175 so that malware reporting module 150 stops the sending of message 175 (including 175a) to the network interface 150. Still furthermore malware reporting module 150 can disable messaging application 110 until the malware application 170 has been removed.

Regardless of configuration, malware reporting module 140 is ultimately configured to report detection of (or improper use of) the decoy contact address 125c. Specifically, malware reporting module 140 can send one or more reports to a remote location, which immediately triggers generation of an alert for an administrator. Similarly, malware reporting module 140 can send one more reports to a store that another module (not shown) periodically monitors. Upon identifying inclusion of the report sent by malware reporting module 140 in the store, the monitoring module may then generate a similar alert, or otherwise provide an indicator that signals that the user's computer system has been infected with a malware application.

Accordingly, FIGS. 1A-1B and the corresponding text provide a number of different components and modules that can be used to efficiently and adequately identify the presence of a malware infection on a host computer system. In addition to the foregoing, implementations of the present invention can also be described in terms of flowcharts comprising one or more acts in a method for accomplishing a particular result. For example, FIG. 2 illustrates a method of using one or more decoy contacts to determine that a computer system has been infected with malware. By contrast, FIG. 3 illustrates a method of configuring a computer system to report the presence of malware based on messages to one or more decoy contacts. The acts of FIGS. 2 and 3 are discussed more fully below with respect to the components of FIGS. 1A-1B.

For example, FIG. 2 shows that a method in accordance with an implementation of the present invention can comprise an act 200 of installing a decoy contact in a contact store. Act 200 includes installing one or more decoy contacts in a contact store used by one or more messaging applications in a host computer system. For example, as shown in FIG. 1A, system 100 receives decoy 125c, and installs or otherwise adds decoy 125c to contact store 120.

FIG. 2 also shows that a method in accordance with an implementation of the present invention can comprise an act 210 of identifying that a message has been sent to the decoy contact. Act 210 includes identifying that one or more messages have been sent to any of the one or more decoy contacts from the host computer system. For example, FIG. 1B shows that malware reporting module 140 has filtered out message 175a and passed it to an inbox associated with decoy contact 125c.

In addition, FIG. 2 shows that the method in accordance with the present invention can comprise an act 220 of determining that the host computer has been compromised by malware. Act 220 includes determining that the host computer system has been compromised with one or more malware applications based at least in part on the message to the one or more decoy contacts. For example, as previously described, because message 175a has been sent by any entity to inbox 130a, the malware reporting module 140 will know (or can assume) that a malware application (e.g., 170) has been installed in the system 100. In one implementation, this knowledge or assumption will be true at least in part since the decoy contact 125c has been hidden from any user that would ordinarily select contacts for sending messages.

By contrast, FIG. 3 illustrates that an additional or alternative method in accordance with an implementation of the present invention can comprise an act 300 of identifying a message application at a host computer system. Act 300 includes identifying one or more messages applications used by a host computer system. For example, system 100 identifies one or more messaging applications 110 used by a user (e.g., "user@ISP-X.com").

FIG. 3 also shows that the method in accordance with an implementation of the present invention can comprise an act 310 of identifying a contact store used by the messaging applications. Act 310 includes identifying one or more contact stores that are used by the one or more messaging applications. For example, FIG. 1A shows that system 100 comprises contact store 120 which is associated with messaging application 110. An administrator of system 100, therefore (e.g., the user of a personal computer, or an administrator over users in a network) can identify the application programs and contacts that will be associated with installation of the malware application 170 and reporting module 140.

In addition, FIG. 3 shows that the method in accordance with the present invention can comprise an act 320 of sending instructions to add a decoy contact and install a malware reporting module. Act 320 includes sending one or more messages to add one or more decoy contacts in any of the one or more contact stores, and to install one or more malware reporting modules configured at least in part to filter messages sent to the installed one or more decoy contacts. For example, as shown in FIG. 1A, system 100 receives instructions (e.g., sent by an administrator) to install decoy contact 125c with contact store 120, and to install malware reporting module 140 in conjunction with messaging application 110.

Furthermore, FIG. 3 shows that the method in accordance with an implementation of the present invention can comprise an act 330 of installing an alternate inbox for each added decoy contact. Act 330 includes installing one or more alternate inboxes configured to receive messages directed to the corresponding one or more installed decoy contacts. For example, as shown in FIG. 1B, system 100 has installed an alternate inbox 130a corresponding to the newly installed decoy contact 125c.

Still further, FIG. 3 shows the method in accordance with an implementation of the present invention can comprise an act 340 of reviewing a report that a message was sent to a decoy contact. Act 340 includes reviewing one or more reports that indicate that a message has been sent to an installed decoy contact. For example, malware reporting module 140 generates a report anytime it detects a message sent to a decoy contact 125c from messaging application 110, such as message 175a. Alternatively, malware reporting module 140, or yet another module such as a server-based module (not shown), can periodically monitor inbox 130a and identify any time a message (e.g., 175a) has been sent or received in inbox 130a. The alternate module would then prepare a report that is reviewable by the administrator to determine that the computer system 100 has been infected with the malware application (e.g., 170).

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. At a host computer system having installed thereon one or more messaging applications that send and receive messages to or from one or more contacts, a method of the host computer system detecting the presence of malware at the host computer system using a decoy contact, the method comprising:

an act of installing a decoy contact in a contact store at a host computer system, the contact store being used by a messaging application at the host computer system;

an act of installing a malware reporting module at the host computer system between the messaging application and a network interface that transmits messages to one or more recipients through a network, the malware reporting module being configured to intercept outgoing messages sent by the messaging application to the one or more recipients through the network prior to the outgoing messages actually reaching the network interface at the host computer system and prior to being received by the one or more recipients;

an act of the malware reporting module at the host computer system intercepting an outgoing message subsequent to the outgoing message being sent by the messaging application and prior to the outgoing message being received at the network interface;

an act of the malware reporting module at the host computer system identifying that the outgoing message is addressed to the decoy contact;

based on identifying that the outgoing message is addressed to the decoy contact, an act of the malware reporting module at the host computer system stopping communication of the outgoing message, such that the outgoing message is prevented from being sent to the network interface; and an act of the malware reporting module at the host computer system determining that the host computer system has been compromised with malware based at least in part on identifying that the outgoing message is addressed to the decoy contact and prior to the outgoing message being communicated over the network interface.

2. The method as recited in claim 1, further comprising an act of replacing the installed decoy contact with one or more new decoy contacts.

3. The method as recited in claim 2, further comprising an act of the malware reporting module at the host computer system intercepting an additional outgoing message sent by the messaging application that is addressed to one or more of the new decoy contacts.

4. The method as recited in claim 1, wherein identifying that the outgoing message is addressed to the decoy contact comprises identifying an address of the decoy contact in the outgoing message.

5. The method as recited in claim 1, further comprising, in response to determining that the host computer system has been compromised with malware, an act of the malware reporting module halting activities of the messaging application.

6. The method as recited in claim 1, wherein the installed decoy contact comprises a contact address that includes an invalid network or domain address.

7. The method as recited in claim 1, further comprising:

an act of hiding the installed decoy contact at the host computer system, such that the installed decoy contact is invisible to a user of the host computer system, and such that the installed decoy contact is unavailable for the user to send a message.

8. The method as recited in claim 1, further comprising:

an act of the malware reporting module forwarding the outgoing message to an inbox at the host computer system that is associated with the decoy contact.

9. A computer system, comprising:
one or more processors;
a network interface; and
one or more computer storage devices having stored thereon computer-executable instructions that, when executed by the one or more processors, cause the computer system to perform a method of configuring the computer system to detect the presence of a malware application at the computer system using messages addressed to a decoy contact, the method comprising:
identifying one or more messaging applications at the computer system;
identifying one or more contact stores at the computer system that are used by the one or more messaging applications;
adding one or more decoy contacts in any of the one or more contact stores; and
installing one or more malware reporting modules at the computer system between the one or more messaging applications and the network interface, the one or more malware reporting modules configured, at least in part, to intercept and filter outgoing messages sent by the one or more messaging applications prior to the outgoing messages actually reaching the network interface at the computer system, and to detect outgoing messages that are addressed to one or more of the decoy contacts and prevent the outgoing messages addressed to one or more of the decoy contacts from being sent to the network interface at the computer system.

10. The computer system as recited in claim 9, wherein the one or more installed decoy contacts comprise a messaging address that directs messages to a local area network address.

11. The computer system as recited in claim 10, wherein the local area network address comprises a network address for the computer system.

12. The computer system as recited in claim 9, wherein the one or more installed malware reporting modules prepare one or more reports that indicate that an outgoing message has been addressed to an installed decoy contact.

13. The computer system as recited in claim 9, wherein the one or more malware reporting modules are configured to halt activities by the one or more messaging applications upon detecting any outgoing message addressed to any of the one or more decoy contacts.

14. The computer system as recited in claim 9, wherein the one or more contact stores comprise:
existing contacts created by a user of the one or more messaging applications;
the one or more installed decoy contacts; and
one or more addresses parsed from messages in the user's inbox or outbox corresponding to the one or more messaging applications.

15. The computer system as recited in claim 9, further comprising computer-executable instructions for instructing the one or more messaging applications to hide the one or more decoy contacts from a user of the one or more messaging applications so that the user cannot send a message to the one or more decoy contacts.

16. The method as recited in claim 8, wherein the inbox at the host computer system comprises a storage partition of a user's traditional mailbox for the messaging application.

17. A computer storage device having computer-executable instructions stored thereon that, when executed, cause one or more processors of a host computer system to perform a method comprising:
providing a decoy contact in a contact store at a host computer system, the contact store used by a messaging application at the host computer system;
providing a malware module at the host computer system between the messaging application and a network interface that transmits messages to one or more recipients through a network, the malware module being configured to intercept outgoing messages sent by the messaging application to the one or more recipients through the network prior to the outgoing messages actually reaching the network interface at the host computer system and prior to being received by the one or more recipients;
the malware module at the host computer system intercepting an outgoing message subsequent to the outgoing message being sent by the messaging application and prior to the outgoing message being received at the network interface;
the malware module at the host computer system determining that the outgoing message is addressed to the decoy contact, and based on identifying that the outgoing message is addressed to the decoy contact, preventing the outgoing message from being sent to the network interface; and
the malware module at the host computer system determining that the host computer system has been compromised with malware based at least in part on identifying that the outgoing message is addressed to the decoy contact and prior to the outgoing message being received at any messaging inbox, including any messaging inbox for the decoy contact.

* * * * *